United States Patent [19]

Takahashi et al.

[11] Patent Number: 4,805,721

[45] Date of Patent: Feb. 21, 1989

[54] POWER TRANSMITTING SYSTEM FOR A FOUR-WHEEL DRIVE VEHICLE

[75] Inventors: Mitsuo Takahashi, Oota; Fusami Oyama, Ouramachi; Yukio Kodama, Ohta, all of Japan

[73] Assignee: Fuji Jukogyo Kabushiki Kaisha, Tokyo, Japan

[21] Appl. No.: 16,875

[22] Filed: Feb. 18, 1987

[30] Foreign Application Priority Data

| Feb. 26, 1986 | [JP] | Japan | 61-42601 |
| Feb. 26, 1986 | [JP] | Japan | 61-42602 |
| Feb. 28, 1986 | [JP] | Japan | 61-43596 |
| Feb. 28, 1986 | [JP] | Japan | 61-43597 |
| Mar. 26, 1986 | [JP] | Japan | 61-67789 |

[51] Int. Cl.$^4$ ............................................. B60K 17/04
[52] U.S. Cl. ...................................... 180/248; 180/197
[58] Field of Search ............... 180/247, 248, 249, 250, 180/233, 197; 74/701, 705, 710.5

[56] References Cited

U.S. PATENT DOCUMENTS

| 3,627,072 | 12/1971 | Smirl | 180/249 |
| 3,923,113 | 12/1975 | Pagdin | 180/249 |
| 4,420,059 | 12/1983 | Suzuki | 180/297 |

Primary Examiner—David M. Mitchell
Assistant Examiner—Donn McGiehan
Attorney, Agent, or Firm—Martin A. Farber

[57] ABSTRACT

An oil hydraulic clutch having opposite disks is provided in a power transmitting system. One of disks is operatively connected to one of side gears of the central differential through a gear train and the other of the disks is operatively connected to the other side gear of the central differential through another gear train, whereby torque is transmitted to front and rear wheels in a distribution ratio.

7 Claims, 6 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle.

In a conventional four-wheel drive vehicle having a central differential, which is called a full time four-wheel drive vehicle, the central differential operates to uniformly distribute the torque of an engine to front wheels and to rear wheels.

It is known that the distribution ratio of torque has influences on driveability, steerability, stability, starting characteristic and others. Namely, when the distribution to the front wheel is increased, a stable cornering characteristic at high vehicle speed is established, and when distribution to the rear wheels is increased, steerability at low vehicle speed is improved. In the conventional four-wheel drive vehicle, the distribution ratio of torque for front wheels to rear wheels can not be changed.

SUMMARY OF THE INVENTION

The object of the present invention is to provide a system which may change the distribution ratio of torque to the front wheels and rear wheels in accordance with driving conditions of a four-wheel drive vehicle.

According to the present invention, there is provided a power transmitting system for a four-wheel drive vehicle in which power of an engine is transmitted to front and rear wheels through a central differential. The system comprises a torque distribution device including clutch means provided for changing torque transmitted to front and rear wheels, and control means for rendering the clutch means operative.

In an aspect of the invention, the clutch means is an oil hydraulic clutch having opposite disks which operates to transmit torque by the difference between the speeds of the opposite disks, and each of the opposite disks of the clutch means is operatively connected to a side gear of the central differential through a gear train.

The other objects and features of this invention will become understood from the following description with reference to the accompanying drawings.

DETAILED DESCRIPTION OF THE PREFERRED EMBODIMENTS

Figure 1:
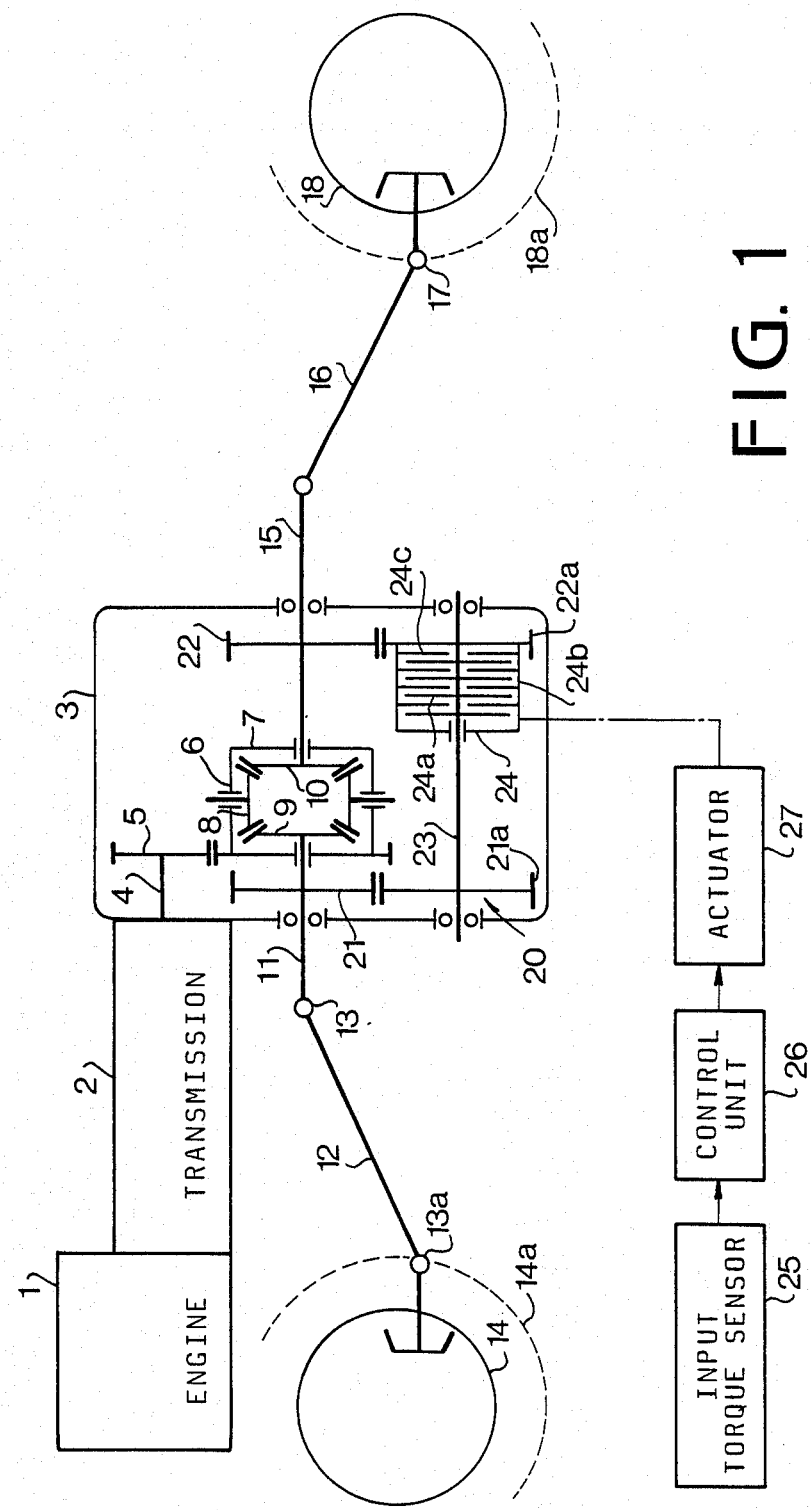
FIG. 1 is a schematic diagram showing a system according to the present invention.
Figure 2:
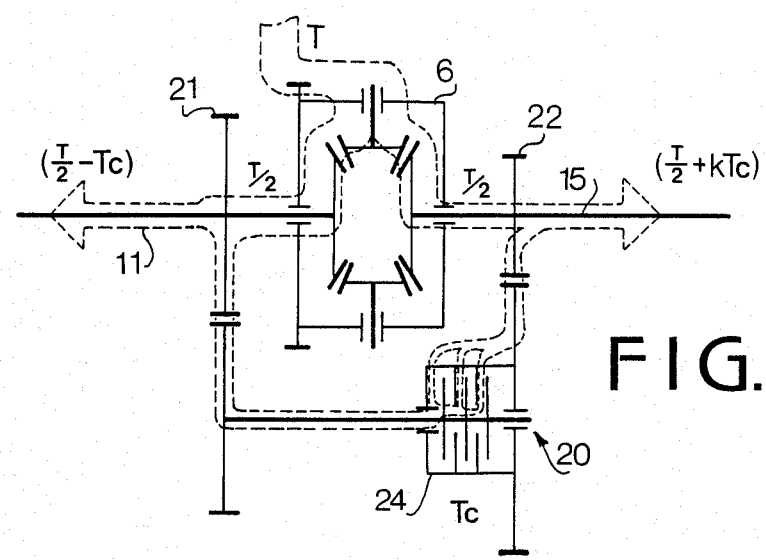
FIG. 2 is a diagram showing the power flow through the system.

Referring to FIG. 1 showing a power transmission system for a four-wheel drive vehicle, reference numeral 1 designates an engine mounted on a front portion of the vehicle. The power of the engine 1 is transmitted to a transfer device 3 through a transmission 2. In the transfer device 3, rotation of an output shaft 4 of the transmission 2 is transmitted to a differential case 7 of a central differential 6 through a gear 5. The central differential 6 comprises a pair of side gears 9 and 10 engaged with pinions 8. A shaft 11 of the side gear 9 is operatively connected to a front differential 14 through joint 13, shaft 12 and joint 13a so as to drive front wheels 14a. On the other hand, the side gear 10 is operatively connected to a rear differential 18 through a shaft 15, joints 17 and shaft 16 so as to drive rear wheels 18a. Thus, the central differential 6 operates to, absorb the difference between the speeds of the front and rear wheels.

In the system of the present invention, a torque distribution device 20 is provided over the central differential 6. The torque distribution device 20 has a gear 21 secured to the front drive shaft 11 and a gear 22 secured to the rear drive shaft 15. The gear 21 engages with a gear 21a secured to a bypass shaft 23 and the gear 22 engages with a gear 22a. The gears 21, 21a, 22 and 22a are so arranged that the gear ratio GF of the gears 21 and 21a are smaller than the gear ratio GR of gears 22 and 22a (GF<GR). The shaft 23 is inserted into an oil hydraulic clutch 24 and gear 22a is secured to a drum 24b of the clutch 24. The clutch has a plurality of disks 24a secured to the shaft 23 and disks 24c secured to the drum opposite the disks 24a. The clutch 24 is arranged to transmit the torque from a higher speed disk side to a lower speed disk side.

The system has an input torque sensor 25 for sensing input torque on the shaft 4, and a control unit 26 applied with an input torque signal for detecting engine torque, engine braking and conditions. An output signal of the control unit 26 is applied to a hydraulic actuator 27 to control oil pressure applied to the oil clutch 24.

In operation, the output torque on the output shaft 4 is transmitted to the central differential 6 at which the torque is divided to side gears 9 and 10. The divided torques are transmitted to front and rear drive shafts 11 and 15. At the same time, the torques are transmitted to disks 24a of the oil clutch 24 through gears 21, 21a and shaft 23 and to the drum 24b through gears 22 and 22a, respectively. Speed VF of the disks 24a is higher than speed VR of the drum 24b (VF>VR) due to the gear ratio (GF<GR). Accordingly, the torque is transmitted from disks 24a of the higher speed side to the drum 24b of the lower speed side.

When oil pressure in the clutch 24 is reduced to release the clutch, the members of the torque distribution device idle. Accordingly, the input torque is uniformly distributed to the front and rear drive shafts 11 and 15 as shown by a dashed line in FIG. 3a.

When the oil pressure in the clutch 24 is increased by the actuator 27 in accordance with driving conditions to produce a clutch torque Tc, a torque dependent on the clutch torque Tc is transmitted from disks 24a to drum 24b. Accordingly, the torque to the front wheels is reduced by a torque based on the clutch torque Tc and the gear ratio at the gear 21. To the contrary, the torque to the rear wheels is increased by a torque based on the clutch torque and the gear ratio at gear 22.

Let T=input torque, $\gamma$=gear ratio of a front final gear and a rear final gear, $\omega F$=front-wheel speed, $\omega R$=rear-wheel speed, $\omega 1$=speed of front drive shaft 11, ω2=speed of rear drive shaft 15, ωo=input speed, and if the gear ratio at gear 21 is one and the gear ratio at gear 22 is K·ω1=γ·ωF, ω2=·ωR, and ωo=(ω1+ω2)/2. Let ω3=speed of the drum 24b and if K=ω3/ω2<1, ω3 becomes smaller than ω2 ($\approx$ω1).

Accordingly, a torque is transmitted from drum 24b to disks 24a in the braking direction, and a torque is transmitted from the disks to the drum in the driving direction.

Figure 3A:
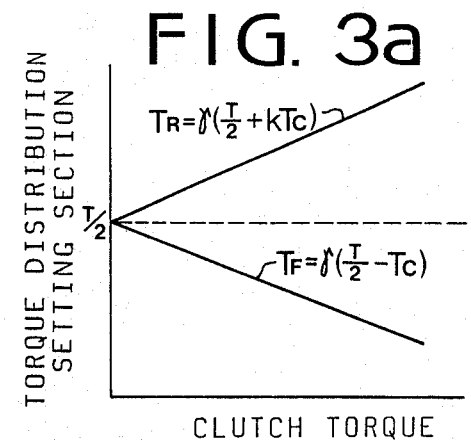
FIGS. 3a and 3b are graphs showing characteristics of torque distribution control.
Figure 8B:
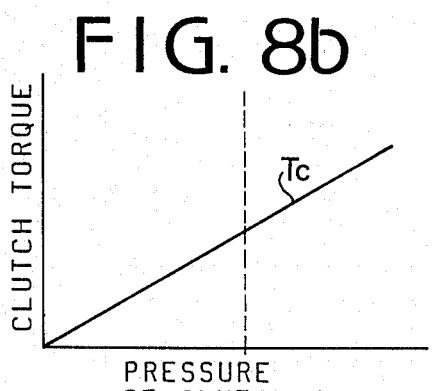
Figure 3B:
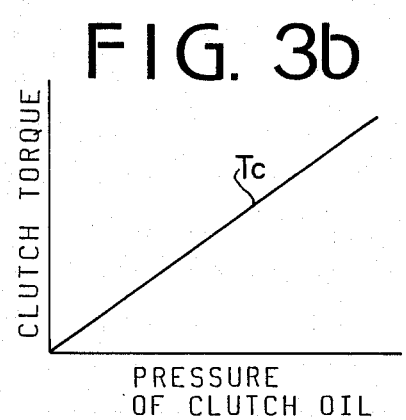

Since the torque of the front drive shaft 11 is T/2−Tc, front wheel drive torque TF=γ(T/2−Tc). Since the torque of the rear drive shaft 15 is T/2+K·Tc, rear wheel torque Tr=γ(T/2+K·Tc). Thus, torque TF decreases with increase of the torque Tc and torque TR increases with increase of torque Tc as shown in FIG. 3a.

Distribution ratio RF to the front wheels is expressed as follows.

$$RF = TF/(TF + TR)$$
$$= 1/\{1 + (T/2 + K \cdot Tc) \div (T/2 - Tc)\}$$

Accordingly, torque Tc is calculated to produce a predetermined distribution ratio RF with respect to the input torque T, and the pressure of oil in the clutch is determined by the clutch torque Tc.

If gear ratios at gears 21 and 22 are set in the reverse of the above described relation, torque distribution ratio RF to the front wheels becomes larger than the rear wheels.

Figure 4:
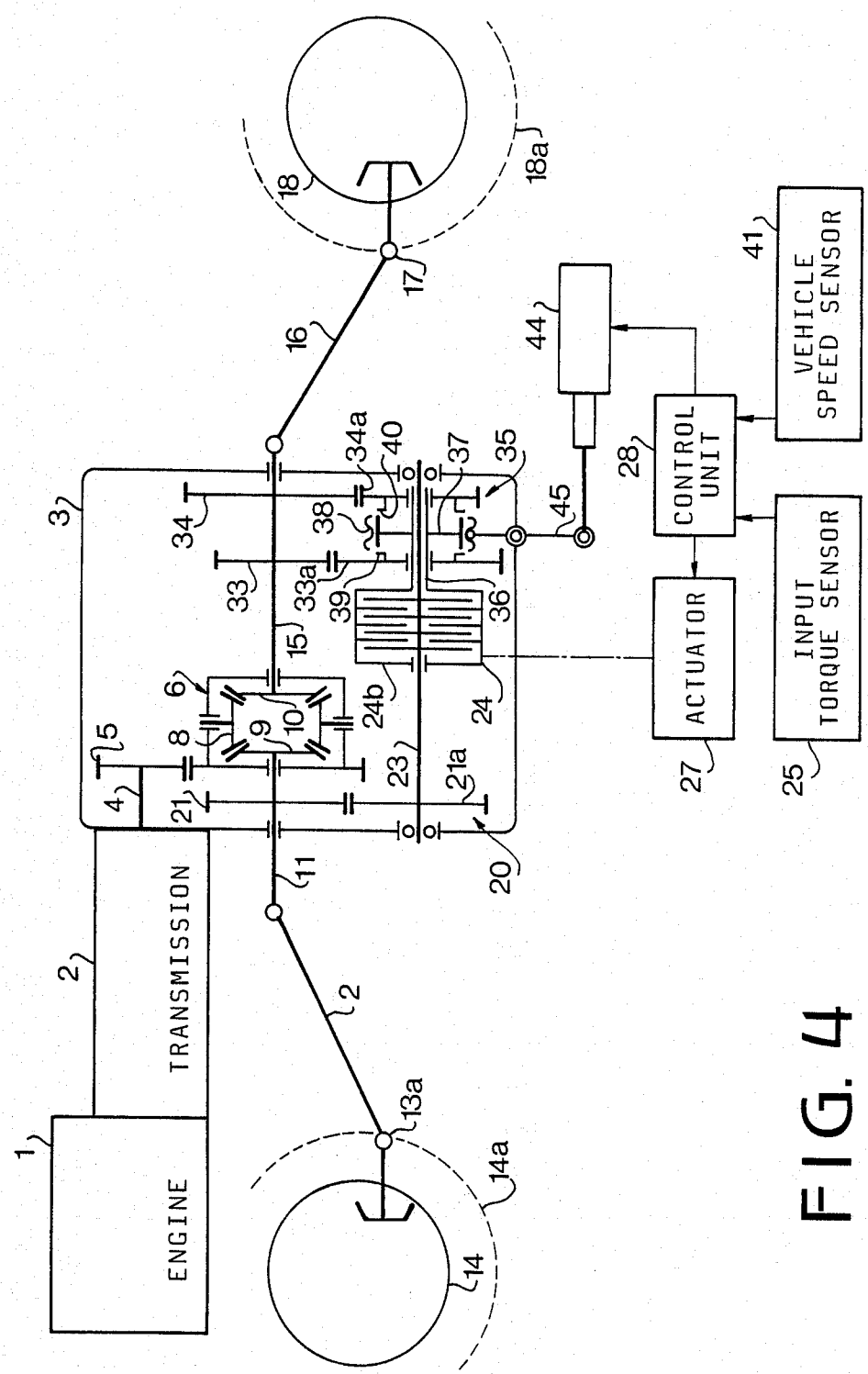
FIG. 4 is a schematc diagram showing another embodiment of the present invention.

Referring to FIG. 4 showing another embodiment of the invention, the same parts as the system of FIG. 1 are identified by the same references as FIG. 1. The system has a pair of change speed gears 33, 34, 33a and 34a, and a synchronizer 35 as a changeover clutch, in addition to the previous system of FIG. 1. Gear ratios GF of gears 21, 21a, GR1 of gears 33, 33a and GR2 of gears 34, 34a are selected as follows.

GF<GR1

GF>GR2

The gears 33a and 34a are rotatably mounted on a cylindrical shaft 36 extending from the drum 24b of the oil clutch 24. The synchronizer 35 has a hub 37 secured to the shaft 36 and sleeve 38 which is selectively engaged with splines 39 and 40 of gears 33a and 34a so as to operatively engage one of the gears with the shaft 36.

The system is further provided with a vehicle speed sensor 41 and an actuator 44 operatively connected to the sleeve 38 through a lever 45.

When vehicle speed is higher than a predetermined value, control unit 28 produces a signal to operate the actuator 44 to engage the sleeve 38 with splines 39. Accordingly, gear 33a engages with shaft 36 through the synchronizer 35. Since the gear ratio GF at gear 21 and 21a is smaller than the gear ratio GR1 of gears 33 and 33a, the distribution ratio RF to the front wheels is smaller than the rear wheels, which is the same as the system of FIG. 1 in operation.

When the vehicle speed decreases below the predetermined value, the actuator 44 operates to engage the sleeve 38 with splines 40, thereby engaging the gear 34a with shaft 36. Since the gear ratio GF is larger than the gear ratio GR2 of gears 34 and 34a, the distribution ratio RF to the front wheels is larger than the rear wheels.

Figure 5:
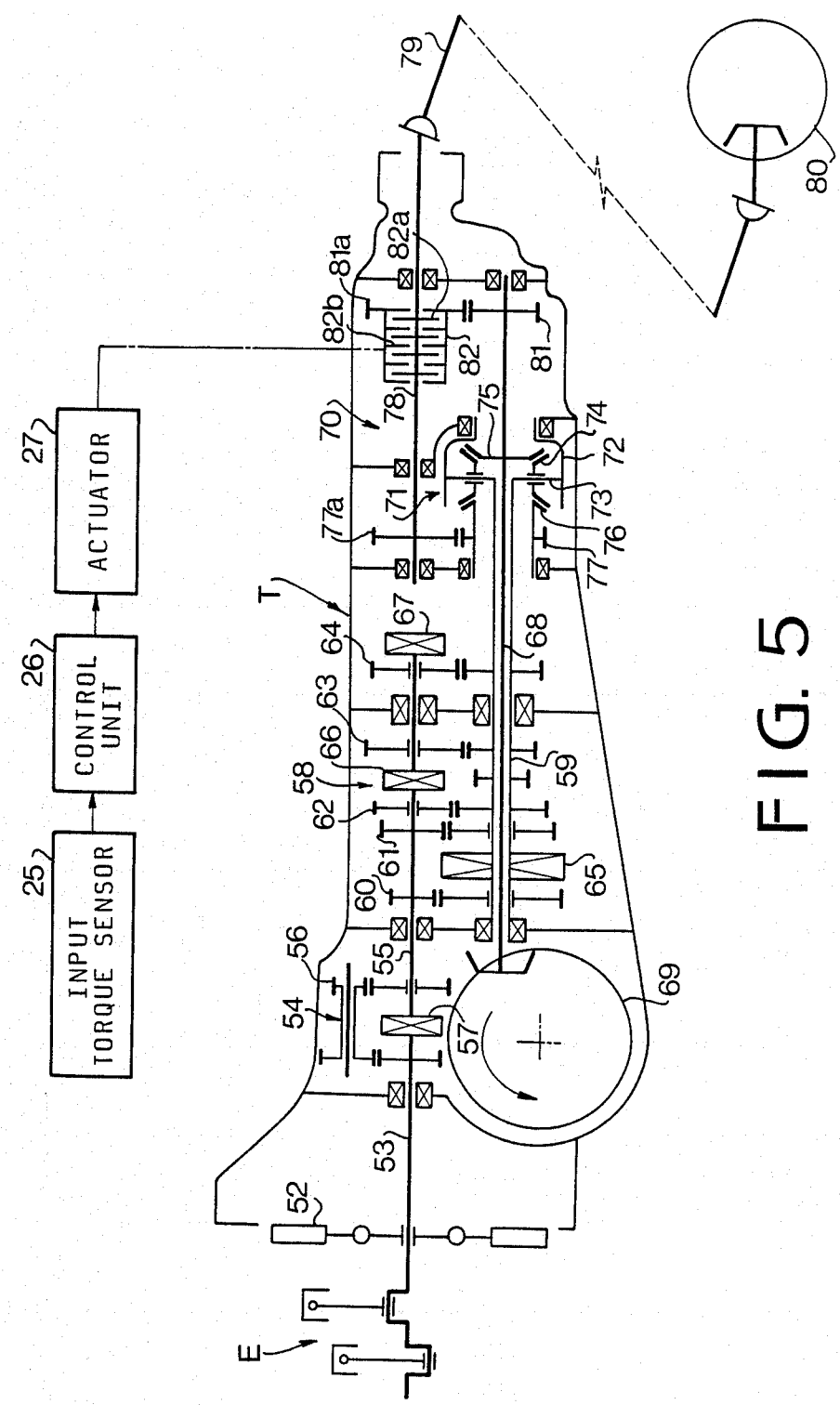
FIG. 5 shows a further embodiment of the present invention.

Referring to FIG. 5 showing a further embodiment of the invention, an engine E and transmission T are longitudinaly mounted on a vehicle. The crankshaft of the engine is operatively connected to a sub-transmission 54 through a clutch 52 and a shaft 53. The sub-transmission 54 has a reduction gear train 56 and a clutch 57 for selectively coupling the shaft 53 and gear train 56 to an input shaft 55. A main transmission 58 comprises first to fifth speed gears 60 to 64 and synchronizers 65 to 67. An output shaft 59 is cylindrical and rotatably supports a front drive shaft 68 therein. The front drive shaft 68 is operatively connected to a front differential 69 to drive front wheels. The output shaft 59 is connected to spiders 73, each rotatably supported in a case 72 of a central differential 70. A side gear 75 is secured to the front drive shaft 68 and another side gear 76 is operatively connected to a rear drive shaft 78 through gears 77 and 77a. The rear drive shaft 78 is operatively connected to a rear differential 80 through a propeller shaft 79 to drive the rear wheels.

An oil clutch 82 as a torque distribution device is provided on the shaft 78. A drum 82b of the clutch is connected to the front drive shaft 68 through gears 81a and 81. A plurality of disks 82a are secured to the shaft 68. The torque distribution ratio RF is determined by the gear ratio GF of gears 81 and 81a and the gear ratio GF of gears 77 and 77a.

Figure 6:
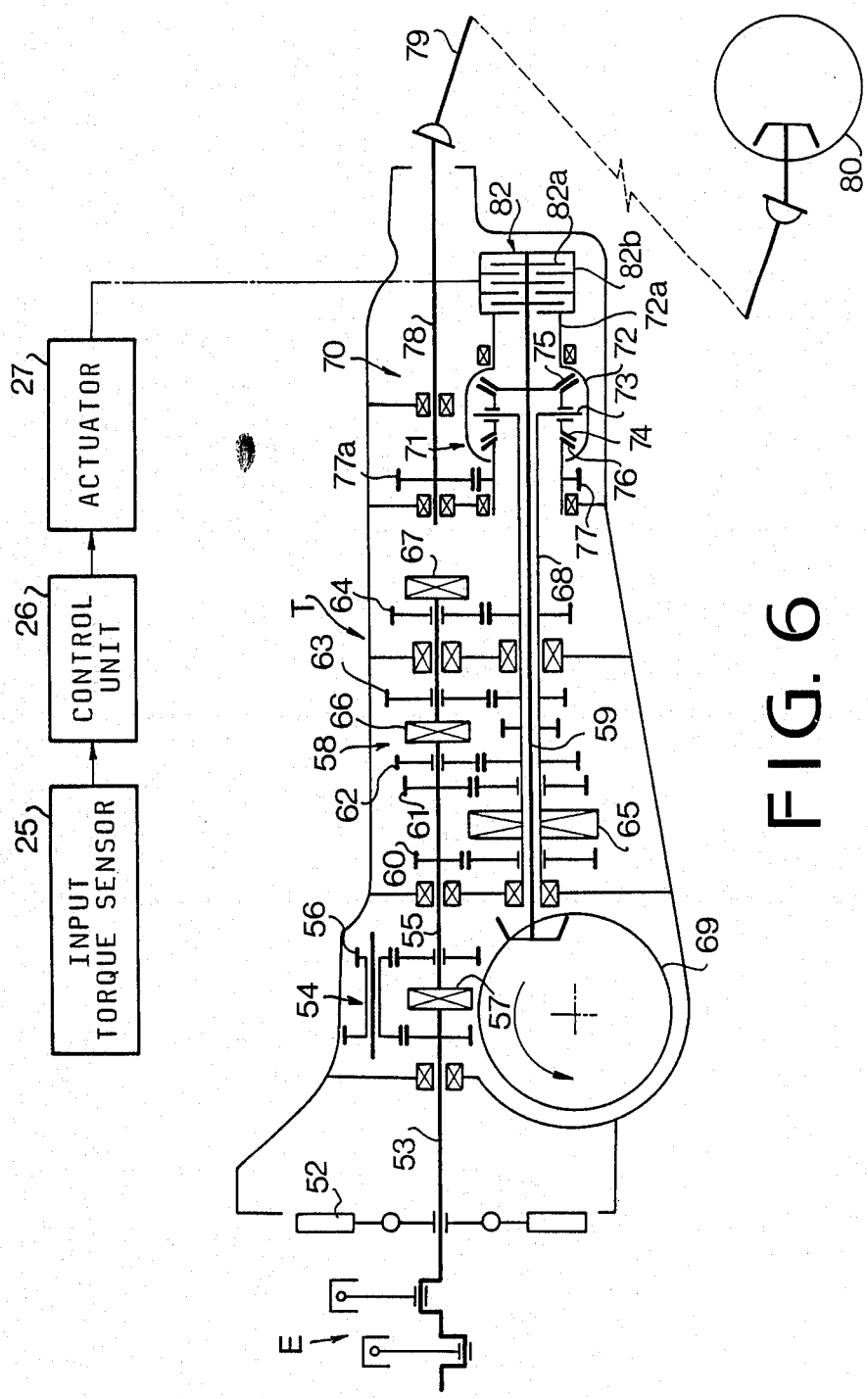
FIGS. 6 and 7 show further embodiments, respectively.

Referring to FIG. 6 showing another embodiment, the same parts as FIG. 5 are identified with the same references as FIG. 5. In the system, the oil clutch 82 is provided on the front drive shaft 68 which has a plurality of disks 82a. The drum 82b is connected to a shaft portion 72a of the central differential 71.

Gear ratio GR of gears 77 and 77a is, for example set to a value larger than one (GR>1). Accordingly, a difference occurs between the speeds of side gears 75 and 76, so that the speed of the disks 82a is higher than the drum 82b. Thus, the distribution ratio RF is smaller than rear wheels.

Figure 7:
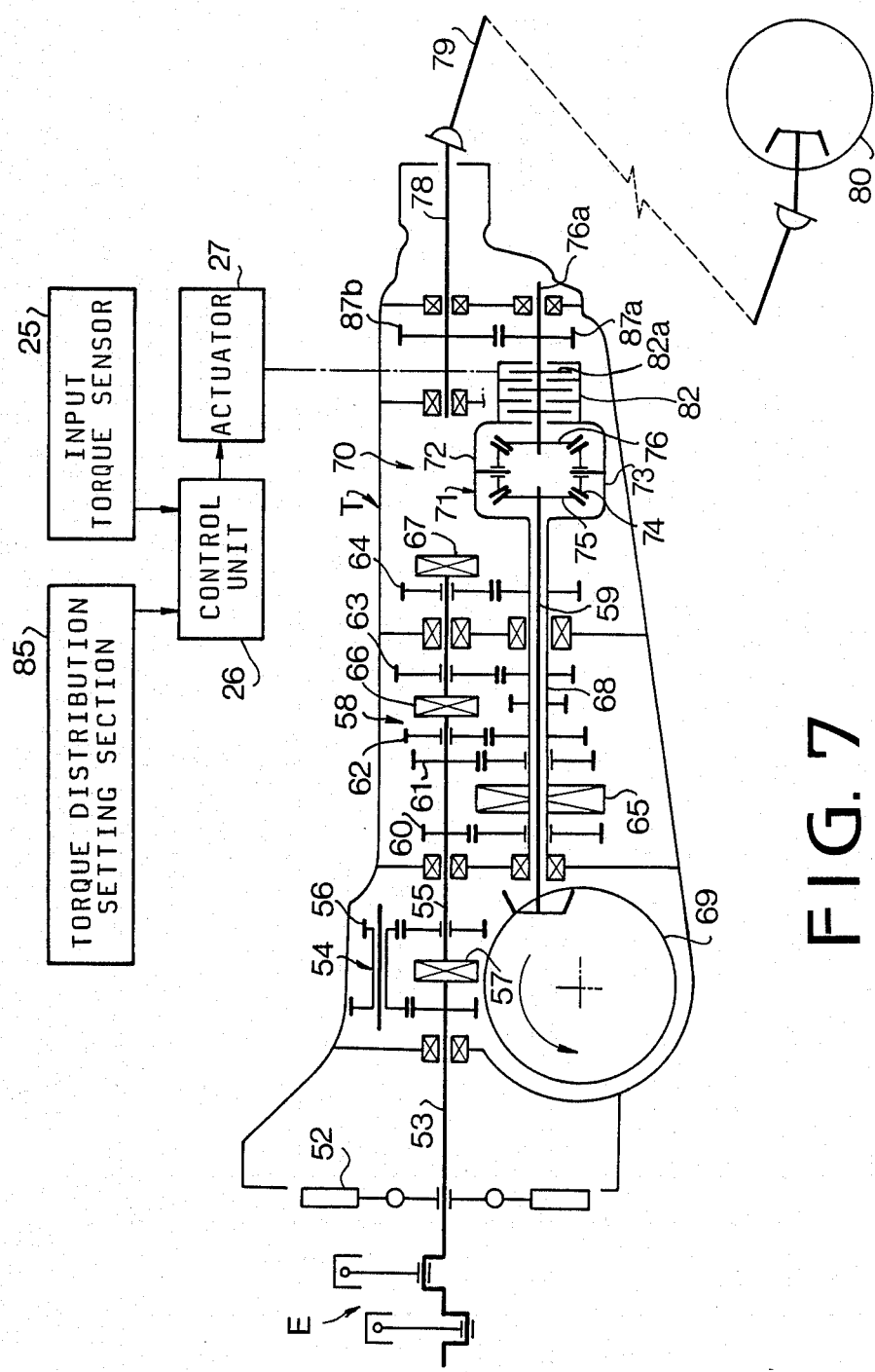

Referring to FIG. 7 showing a further embodiment, the oil clutch 82 is provided on a shaft 76a of the side gear 76 for rear drive shaft 78. The shaft 76a is inserted in the oil clutch 82 and has a plurality of disks 82a. The shaft 76a is connected to rear drive shaft 78 through gears 87a and 87b. Gear ratio GR of gears 87a and 87b is set to a value other than zero. For example GR is smaller than 1 (the number of teeth (a) of gear 87a is larger than the number of teeth (b) of gear 87b). The system has a torque distribution setting section 85 for controlling the pressure of oil in the clutch 82 to vary the clutch torque Tc.

Input torque of the central differential 71 is expressed as T+Tc (T is output torque of the transmission). Accordingly, output torque TF for the front wheels is expressed as follows.

$$TF = \tfrac{1}{2}(T + Tc)$$

Output torque TR is expressed as follows.

$$TR = \{\tfrac{1}{2}(T + Tc) - Tc\} \times a/b$$
$$= \tfrac{1}{2} \times a/b(T - Tc)$$

Figure 8A:
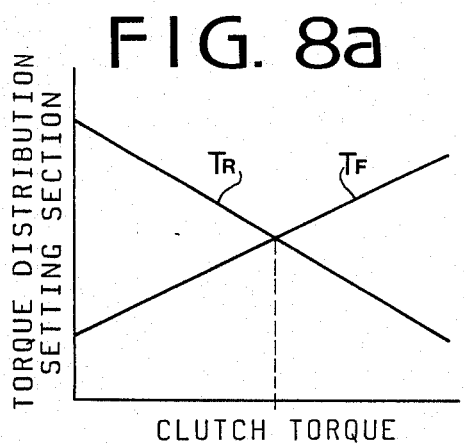
FIGS. 8a and 8b are graphs showing characteristics of the system of FIG. 7.

Thus, torque distributions vary as shown in FIG. 8a.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive vehicle in which power of an engine is transmitted to front and rear wheels through a central differential, the system comprising:
   a torque distribution device including clutch means provided for changing torque transmitted to front and rear wheels;
   control means for rendering the clutch means operative;
   the clutch means is provided between both side gears of the central differential;
   said clutch means has opposite disks; and
   each of the opposite disks of the clutch means is operatively connected to a corresponding side gear through a gear train.

2. A power transmitting system for a four-wheel drive vehicle in which power of an engine is transmitted to front and rear wheels through a central differential, the system comprising:
   a torque distribution device including clutch means operatively connected to the central differential;
   control means for producing a control signal;
   the clutch means for changing clutch torque to either of the front and rear wheels as a varying function of the control signal, thereby changing distribution of torque transmitted to the front and rear wheels;
   said control means detects at least one driving condition of the vehicle and said control signal is a function of the value of said driving condition;
   said clutch means changes said clutch torque to either of the front and rear wheels as a varying function of the control signal, thereby changing distribution of torque transmitted to the front and rear wheels in dependency on the value of said driving condition; and
   said at least one driving condition is input torque to the central differential.

3. A power transmitting system for a four-wheel drive vehicle in which power of an engine is transmitted to the front and rear wheels through a central differential, the system comprising:
   a torque distribution device inclluding clutch means operatively connected to the central differential;
   control means for producing a control signal;
   the clutch means for changing clutch torque to either of the front and rear wheels as a varying function of the control signal, thereby changing distribution of torque transmitted to the front and rear wheels;
   said control means detects at least one driving condition of the vehicle and said control signal is a function of the value of said driving condition;
   said clutch means changes said clutch torque to either of the front and rear wheels as a varying function of the control signal, thereby changing distribution of torque transmitted to the front and rear wheels in dependency on the value of said driving condition; and
   said at least one driving condition is engine braking.

4. A power transmitting system for a four-wheel drive vehicle in which power of an engine is transmitted to front and rear wheels through a central differential, the system comprising:
   a torque distribution device including clutch means operatively connected to the central differential;
   control means for producing a control signal;
   the clutch means for changing clutch torque to either of the front and rear wheels as a varying function of the control signal, thereby changing distribution of torque transmitted to the front and rear wheels;
   said control means detects at least one driving condition of the vehicle and said control signal is a function of the value of said driving condition;
   said clutch means changes said clutch torque to either of the front and rear wheels as a varying function of the control signal, thereby changing distribution of torque transmitted to the front and rear wheels in dependency on the value of said driving condition; and
   said at least one driving condition is input torque to the central differential and vehicle speed.

5. A power transmitting system for a four-wheel drive vehicle in which power of an engine is transmitted to front and rear wheels through a central differential, the system comprising:
   a torque distribution device including clutch means operatively connected to the central differential;
   control means for producing a control signal;
   the clutch means for changing clutch torque to either of the front and rear wheels as a varying function of the control signal, thereby changing distribution of torque transmitted to the front and rear wheels;
   said control means detects at least one driving condition of the vehicle and said control signal is a function of the value of said driving condition;
   said clutch means changes said clutch torque to either of the front and rear wheels as a varying function of the control signal, thereby changing distribution of torque transmitted to the front and rear wheels in dependency on the value of said driving condition; and
   said varying function of the control signal is a linear varying function.

6. A power transmitting system for a four-wheel drive vehicle in which power of an engine is transmitted to front and rear wheels through a central differential, the system comprising:
   a torque distribution device including clutch means operatively connected to the central differential;
   control means for producing a control signal;
   the clutch means for changing clutch torque to either of the front and rear wheels as a varying function of the control signal, thereby changing distribution of torque transmitted to the front and rear wheels; and
   a reduction gear between said clutch means and an output side of said central differential.

7. In a power transmitting system for a four-wheel drive motor vehicle having an engine, a transmission driven by the engine and having an output shaft, a front drive shaft transmitting power from the output shaft to front wheels of the vehicle, a rear drive shaft transmitting power from the output shaft to rear wheels of the vehicle, and central differential means for connecting the output shaft to both of the drive shafts and for enabling different wheel speeds between both drive shafts, the improvement of the system which comprises:
   torque distributing means being operatively connected between the front drive shaft and the rear drive shaft bypassing the central differential means and for forming a variable speed ratio between the front drive shaft and the rear drive shaft to change distribution ratio of torque to said front and rear drive shafts;

input torque sensing means for sensing input torque of the central differential means for producing an input torque signal;

control means responsive to the input torque signal for producing a control signal dependent on the input torque signal;

actuating means responsive to the control signal for producing an actuating signal; and said torque distributing means including clutch means for engaging both drive shafts and for being responsive to the actuating signal so as to vary the distribution ratio in accordance with the input torque signal.

* * * * *